Nov. 26, 1935.  L. J. ROGERS  2,022,153

VENTILATED WHEEL AND BRAKE DRUM

Filed June 21, 1934   3 Sheets-Sheet 1

Inventor
Louis J. Rogers
By Soule & Leonard
Attorneys

Nov. 26, 1935.   L. J. ROGERS   2,022,153
VENTILATED WHEEL AND BRAKE DRUM
Filed June 21, 1934   3 Sheets-Sheet 2
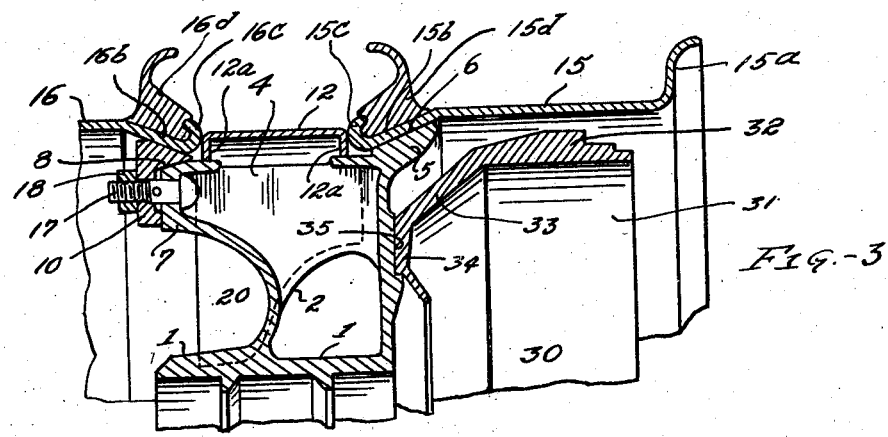
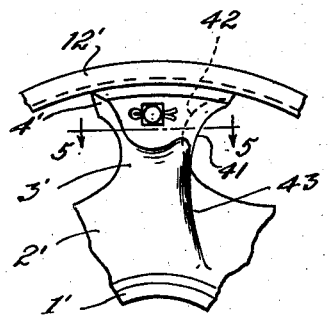
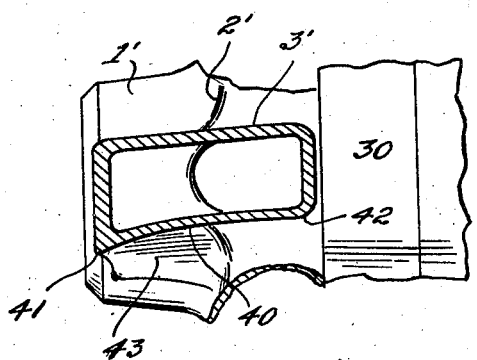
Inventor
Louis J. Rogers
By Soule & Leonard
Attorneys Nov. 26, 1935.   L. J. ROGERS   2,022,153

VENTILATED WHEEL AND BRAKE DRUM

Filed June 21, 1934   3 Sheets-Sheet 3

Inventor
Louis J. Rogers
By Soule & Leonard
Attorneys

Patented Nov. 26, 1935

2,022,153

UNITED STATES PATENT OFFICE 2,022,153

VENTILATED WHEEL AND BRAKE DRUM

Louis J. Rogers, Albion, Pa.

Application June 21, 1934, Serial No. 731,708

3 Claims. (Cl. 301—6)

This invention relates to vehicle wheels and particularly heavy duty wheels such as are employed on trucks and trailers and especially road vehicle wheels adapted to support dual demountable pneumatic tires. Such wheels, whether driving or non-driving wheels, ordinarily carry brake drums, since the dual tired wheels of a vehicle, whether of a trailer or tractor type, present the larger traction surfaces and hence may be most effectively used for deceleration by braking. The brake drums employed are usually of the internal expanding type and in order to obtain a large braking surface as well as to lengthen the effective braking torque arm, the brake drum is made as large as the wheel and tire structure will accommodate.

Where a single wheel structure is made to accommodate two pneumatic tires the wheel is centrally disposed between the two tire and rim assemblies with the major portions of both rims overhanging the wheel, respectively inwardly and outwardly. The inboard overhanging rim is thus usually, if not always, disposed in radial alignment with the brake drum and, as previously stated, in order to provide for most effective braking the drum is made on such diameter that its peripheral surface is disposed close to the inner surface of the inboard rim. This relationship of inboard rim and drum occasions undue heating of the inboard rim and the tire carried thereby, for very often the brake drums attain almost glowing heat under practical conditions; braking on long steep hills e. g. and frequently in ordinary traffic. The tire casing is, of course, open on the inside to receive the tube and except for the usual light tube flap, if and when used, the tube lies substantially directly against the outer peripheral surface of the rim and is subjected to overheating by direct radiation of heat from the drum as well as by conduction through the wheel and tire mountings and to some extent by convection. Such overheating greatly increases the air pressure in the tube and weakens the tube, causing "blowouts" and endangering the lives of the occupants of the vehicle and of persons in passing vehicles.

Radiating fins are often placed on the external peripheral surfaces of the drum to carry this heat away from the brake mechanism but this does not assist in cooling the tire and tube; in fact, if anything, it aggravates the undesirable conditions above stated, as will be obvious.

The primary object of this invention is to provide an effective means for minimizing overheating of pneumatic tires and specifically minimizing overheating of the inboard tires of a dual tired vehicle wheel arrangement such as above discussed, so as to reduce danger of "blowouts".

A specific object is to provide a simple and effective means for mounting cooling fan blades for dual demountable wheel assemblies, which blades are adapted particularly to convey air in large volumes between the inboard rim and the brake drum.

Other objects and advantages of the invention will become apparent from the following specification wherein reference is made to the drawings in which Fig. 1 is an elevation showing the outboard face of a wheel incorporating the invention and portions of the rim and attaching means therefor;

Figs. 2 and 3 are partial radial sectional views of the wheel as indicated on Fig. 1;

Fig. 4 is a fragmentary view of a wheel showing a modified arrangement for conveying air between the inboard rim and brake drum;

Fig. 5 is a detail sectional view of the Fig. 4 arrangement as indicated on Fig. 4.

Figure 1:
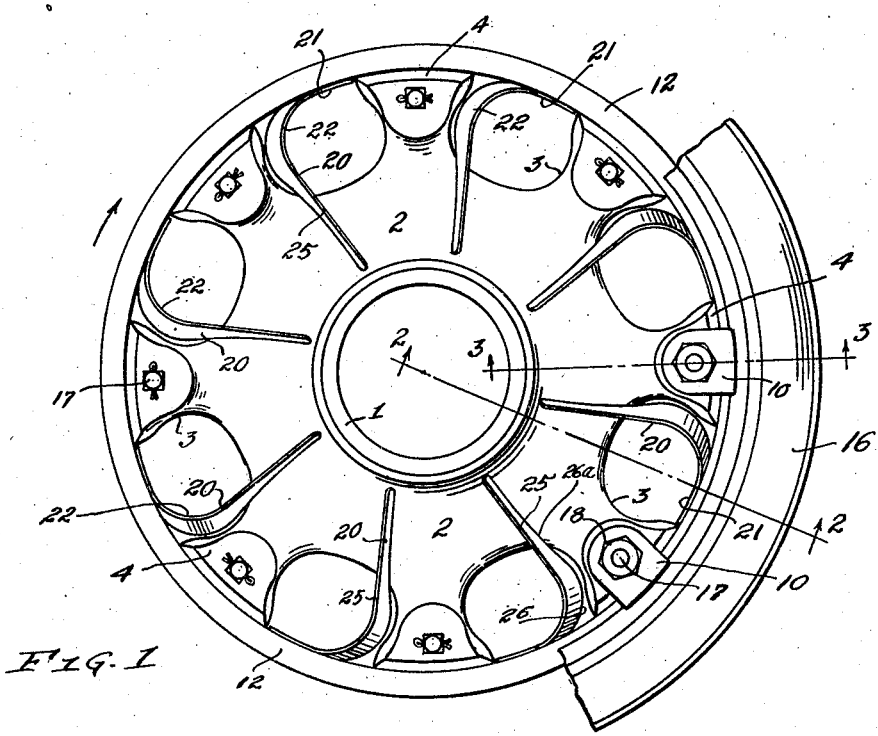

Referring again to the drawings, the wheel shown is adapted to be made as a metal casting and comprises a hub 1 and annular disk portion 2, preferably hollow, from which annular portion hollow spokes 3 extend radially and carry at their outer ends circumferentially spaced felly segments 4. The felly part of the wheel is thus made in spaced segments principally to assist in mounting the tires; that is, in order that the tube inflating valves and ancillary parts may be positioned between any two adjacent spokes. The felly segments comprise, as shown, enlargements of the spokes both circumferentially of the wheel and axially thereof, the axial enlargements being shown particularly in Fig. 3, there being an arm effect 5 on the inboard side of each spoke having an outwardly beveled circumferential surface as at 6 forming a wedging shoulder for engaging the inboard rim in a manner to be presently described and a similar arm effect 7 on the outboard side of each spoke, the latter arm effect being beveled toward the wheel axis as at 8 to cooperate with the usual rim securing wedges or lugs 10 in conventional fashion.

Intermediately of the beveled surfaces 6 and 8, the felly segments are formed substantially cylindrically with reference to the wheel axis, and a suitable spacer ring 12 is carried on the substantially cylindrical surfaces, the ring being preferably continuous and being, as shown, in the form of a channel with flanges 12a at each side extending inwardly toward the axis of the wheel and resting on the generally cylindrical peripheral surfaces of the felly segments; see Fig. 3.

Figure 2:
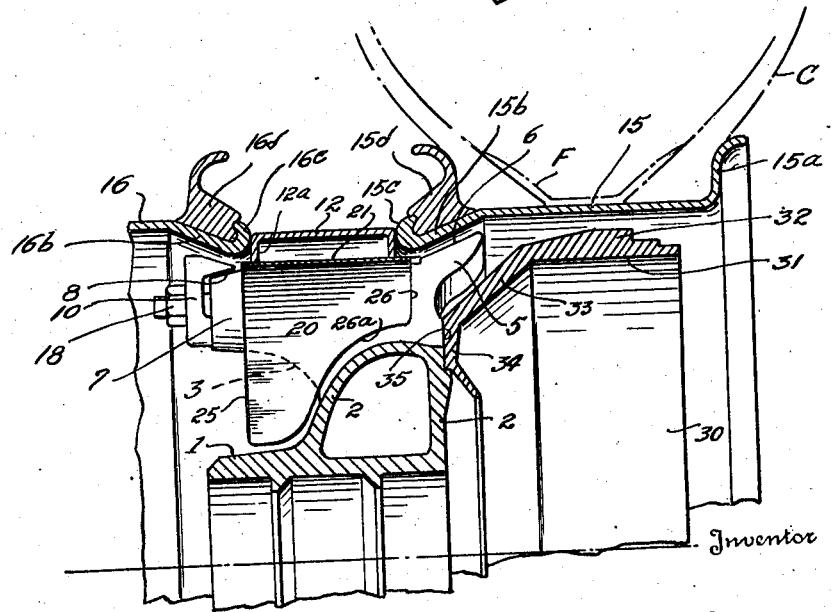

Referring to Fig. 2 or 3 and first to the inboard rim, designated 15, it will be seen that this has an outwardly extending flange at 15a adapted to retain one side of the tire casing, shown in broken lines at C, (flap at F), and an inwardly extending somewhat conical flange 15b substantially complementary to the shoulder surfaces 6 of the felly segments and having a curled or hooked flange portion at 15c. The usual split ring 15d is carried on the outer surface of the conical flange 15b interlocking with the curled portion 15c thereof and having a flange similar to the flange 15a for retaining the opposite side of the tire casing. The outboard rim 16 is, as shown, identical with the inboard rim and the parts are similarly indicated: 16b, 16c etc. The rim details just described are conventional and for example only.

To assemble the rim and spacer arrangement just described onto the wheel, the inboard rim and tire is placed over the outboard end of the wheel and moved substantially to the position shown in Fig. 3 in which the conical flange 15b abuts the wheel surface 6. The ring 12 is then slipped over the wheel and brought into engagement with the curled portion 15c of the inboard rim. The outboard rim 16 is then placed on the wheel with the curled portion 16c engaging the outboard flange of the spacer. The wedges or lugs 10 may now be secured to respective spokes of the wheel, as by bolts and nuts 17, 18, the wedge surfaces being respectively forced against the wheel surfaces 8 and the conical flange of the outboard rim to fully tighten the entire assembly. This is the usual manner of mounting dual tires on a single wheel.

Referring again to the spacer 12, this carries, as on the inside surfaces of the flanges, a plurality of blades 20 which may be formed as shown in Figs. 1 and 2, or modified for greater or less air delivery. The blades may have their outer or base portions 21 spot-welded or otherwise suitably secured to the spacer flanges as a convenient support. Adjacent the base portions the blades are bent on generous radii as at 22 close to the respective spoke surfaces which face in the direction of rotation of the wheel, leaving an enlarged space between each blade 20 and the spoke surfaces which face in the opposite direction, as will be clear from Fig. 1. The blades preferably extend axially of the wheel for short distances beyond both flanges of the spacer and also inwardly generally radially of the wheel adjacent the annular hollow disc portion 2, thus being adapted to deflect air from the entire space between the central hub 1 and the outboard rim.

The major surfaces of the blades (as shown in Fig. 1) are warped or suitably disposed so that the outboard edges 25, Fig. 2, are positioned forwardly with relation to the direction of rotation of the wheel from the inboard edges 26 and 26a. The outboard edges 25 may also have flanges, if desired, (not illustrated) to increase the volume of air delivered by the blades by preventing spilling of air off the edges 25 in an outboard direction. Ordinarily this is not necessary as simply disposing the blades at a slight angle as above described has been found to deliver a sufficient volume of air to effect the purposes above outlined. Preferably the clearance between the curved edges 26a of the blades and the adjacent surfaces of the wheel portion 2 is very slight,— say 1/8 inch, and this is only necessary because of variations in the surface of the casting.

The brake drum 30, as shown, has a braking surface at 31 on an annular flange 32, the more central portion of the drum (toward the wheel) being frustro-conical as at 33 and planar as at 34, the latter portion serving as an attaching flange adapted to be screwed or otherwise secured to the annularly shouldered inboard face 35 of the wheel.

Referring again to Fig. 2, it will be seen that the spacer 12 is substantially imperforate, the space between the flanges of the spacer being blocked off by the base or attaching portions of the blades for a smooth air path. The surfaces of the wheel lying opposite the spacer are also substantially imperforate and form, with the base portions of the blades, converging air paths leading toward the drum between the spokes. The frustro-conical portion 33 of the brake drum and the frustro-conical portion 15b of the inboard rim form substantially imperforate wall surfaces of a still further converging annular channel for the air delivered by the blades 20 and the more closely adjacent concentric surfaces of the rim and drum are likewise substantially imperforate and smooth for further free passage of air in the inboard direction entirely past the drum. Thus the construction favors high volume delivery of air at high velocity between the rim and brake drum even at low wheel speeds and notwithstanding adverse winds for the comparatively gradually contracting annular passage will be sufficient in view of the comparatively large blade area to insure positive air movement in an inboard direction at all times.

Direct radiation of heat from the drum to the inboard rim is thus reduced to a point such that there is practically no danger of damaging the tube or casing by overheating the drum. Moreover, the surfaces of the wheel leading to the rim supporting assemblies are also cooled by passage of air thereover, and heat necessarily conducted by the spokes of the wheel is, to a large extent, dissipated before reaching the rims. Consequently, the entire tire assembly is protected both against direct radiation of heat from the drum and conductance of heat thereto by the necessary supports.

In the modification shown in Figs. 4 and 5 the wheel casting itself is formed to provide for deflecting air from the region surrounding the wheel hub inwardly over the brake drum surface between it and the overhanging inboard rim. The details of construction of the rim and drum may be as previously described or in accordance with conventional practice. This modification comprises essentially forming the wheel spokes or portions thereof with their surfaces, which face the direction of rotation of the wheel, warped or disposed in a manner to direct the air toward the central plane of the vehicle. In Fig. 4 a portion of the hub 1', hollow disc effect 2', a spoke 3', and felly segment 4' are shown. A portion of a suitable spacer ring 12' is also shown supported on the peripheral surface portion of the felly segment 4'. Fig. 5 is a view showing further details of construction to obtain effective fan blade surfaces and also a portion of the brake drum 30 in its relation to the wheel. For convenience in casting, only the outer portions of the spokes, namely, the felly segment portions, need have a warped or inclined surface (indicated at 40), the forward edge of which surface is shown at 41 and the trailing edge at 42. Continuing this warped or inclined surface, although not necessarily at the same degree of inclination, each spoke may have a flange effect as at 43 formed by casting a suitable web on the wheel connecting the hub portion with the respective felly segment portions. In operation the webs 42 throw the air encountered thereby outwardly toward the warped outer surfaces of the spokes, the latter, in turn, forcing the air to enter between the brake drum and rim as previously described. In this construction, the spacer, if formed of a channel section, is preferably outwardly flanged instead of inwardly flanged so as to eliminate any air pocket which might cut down the free flow of air inwardly toward the drum.

Figure 6:
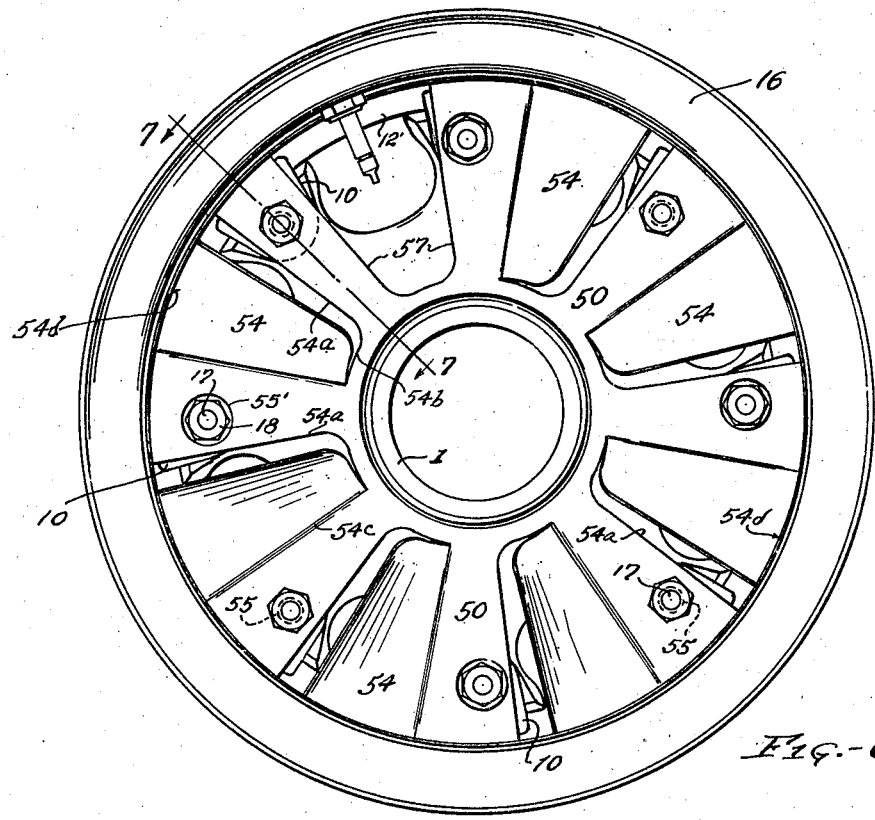
Figs. 6 and 7 are views of a still further modified arrangement, the views corresponding substantially to the Figs. 1 and 2, the plane of Fig. 7 being indicated on Fig. 6.
Figure 7:
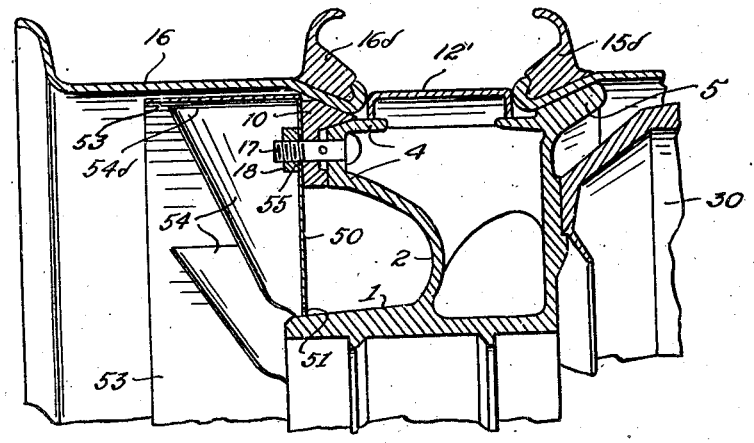

Referring now to Figs. 6 and 7 these illustrate an arrangement whereby the volume of air delivered between the inboard rim and brake-drum is greatly increased and whereby the wheel may be adapted for such ventilation without disturbing the wheel and rim assembly in so doing. A further feature is that this construction permits the use of a conventional spacer ring 12'. In Figs. 6 and 7 there is shown a disc 50 having a central opening 51 adapted to embrace the central hub 1 of the wheel with slight clearance (say ⅛ of an inch), the outer periphery of the disc being secured to a continuous ring 53 as by welding or in other suitable fashion. Both the disc and ring may be made of sheet metal. Radial segments 54 of the disc are partially cut from the disc along the lines 54a and 54b and these segments are suitably turned or pressed outwardly from the plane of the disc, as along the lines 54c. The free edges of the outwardly turned segments are preferably disposed outwardly from the disc a considerable distance and the outer edges of the segments terminate in abutment with the inner surface of the ring 53 as at 54d, Fig. 7 to more effectively entrap air between the blades and the ring. Thus the segments form fan blades disposed with the relation to the direction of rotation of the wheel and with the relation to the ring 53 so that large volumes of air are caught by the blades and thrown in an inboard direction between the wheel and drum assembly and the rim assembly. The blades may be curved in transverse cross section if desired to reduce eddy currents and improve the efficiency. It will be noted that the ring 53 terminates at its inboard edge closely adjacent the outboard rim so that a continuous substantially smooth annular air channel is formed leading inwardly toward the brake-drum. The preferred manner of mounting the arrangement just described is to provide openings as at 55 to receive the usual lug bolts 17 whereby the nuts 18 may be used to clamp both the lugs 10 and the disc. It is unnecessary however, to thus clamp the disc at each and every lug bolt and accordingly certain of the openings indicated at 55' are enlarged to embrace the nuts. These enlarged openings as shown comprise half the total number of openings, the larger alternating in position with the smaller. Thus half the nuts may remain in place while mounting the disc, and only the nuts at the smaller openings temporarily removed. The disc lies flat against the outboard faces of the lugs 10 as will be obvious from Fig. 7 being clamped thereagainst by the alternate nuts 18.

In order to provide sufficient clearance for the inflating valves of the tires one of the blade segments may be omitted, a segmental portion of the disc being shown as cut out as at 57, Fig. 6 to provide the necessary valve stem clearance.

Having thus described my invention, I claim:

1. In a dual demountable rim vehicle wheel having a brake drum extending in the inboard direction beyond the inboard face of the wheel, an inboard rim carried on the wheel and protruding in the inboard direction beyond the wheel and in overhanging spaced relation to the drum, an outboard rim carried on the wheel and protruding in overhanging relation from the outboard face thereof, a circumferentially closed retaining annular band supported within said outboard rim and extending axially thereof, a plurality of fan blades secured at their outer ends to said annular band and protruding inwardly toward the axis of the wheel between the inboard and outboard limits of said band and said fan blades being disposed to circulate air between the inboard rim and brake drum consequent upon rotation of the wheel in a direction of forward travel of the vehicle.

2. In a dual demountable rim wheel having a brake drum extending therefrom in the inboard direction, an inboard rim and an outboard rim carried by the wheel and spaced apart axially of the wheel, the inboard rim overhanging the drum in spaced relation thereto, a spacer substantially blocking the space between said rims, said space between the drum and inboard rim being communicated with the space defined by said spacer and the lateral limits of the wheel, the outboard rim protruding beyond the outboard limit of the wheel, a circumferential annular band fitting snugly within the outboard rim, fan blades secured at their outer ends to said band and extending toward and substantially to the hub of the wheel, and means to secure the circumferential band within the outboard rim, said blades being operable consequent upon forward motion of the wheel to circulate air between said drum and inboard rim.

3. In a dual demountable rim wheel having a brake drum extending therefrom in the inboard direction, an inboard rim and an outboard rim carried by the wheel and spaced apart axially of the wheel, the inboard rim overhanging the drum in spaced relation thereto, a spacer substantially blocking the space between said rims, said space between the drum and inboard rim being communicated with the space defined by said spacer and the lateral limits of the wheel, the outboard rim protruding beyond the outboard limit of the wheel, a circumferential annular band fitting snugly within the outboard rim, fan blades secured at their outer ends to said band and extending toward and substantially to the hub of the wheel, an annular collar coaxial with the hub securing the inner ends of said fan blades in fixed relation to each other, and means to secure a circumferential band within the outboard rim with said hub substantially engaging the hub of the wheel, and said blades being operable consequent upon forward motion of the wheel to circulate air between the said drum and inboard rim.

LOUIS J. ROGERS.